(12) United States Patent
Agarwal et al.

(10) Patent No.: US 7,201,485 B1
(45) Date of Patent: Apr. 10, 2007

(54) CORNER CUBE RETROREFLECTOR

(75) Inventors: Rahul Agarwal, Tampa, FL (US);
Shekhar Bhansali, Tampa, FL (US);
Shinzo Onishi, Palm Harbor, FL (US);
Scott Samson, Safety Harbor, FL (US)

(73) Assignee: University of South Florida, Tampa, FL (US)

( * ) Notice: Subject to any disclaimer, the term of this patent is extended or adjusted under 35 U.S.C. 154(b) by 176 days.

(21) Appl. No.: 10/710,983

(22) Filed: Aug. 16, 2004

Related U.S. Application Data

(60) Provisional application No. 60/495,377, filed on Aug. 15, 2003, provisional application No. 60/481,234, filed on Aug. 15, 2003.

(51) Int. Cl.
*G02B 5/122* (2006.01)
(52) U.S. Cl. ..................................... 359/529
(58) Field of Classification Search ............... 359/529, 359/530; 430/321
See application file for complete search history.

(56) References Cited

U.S. PATENT DOCUMENTS

| | | | |
|---|---|---|---|
| 4,992,699 A | 2/1991 | McClure et al. | |
| 6,318,866 B1 | 11/2001 | Mimura et al. | |
| 6,318,987 B1 * | 11/2001 | Luttrell et al. | 359/529 |
| 6,413,615 B2 | 7/2002 | Smith et al. | |
| 6,447,878 B1 | 9/2002 | Smith et al. | |
| 6,461,003 B1 | 10/2002 | Neudeck | |
| 6,508,558 B1 | 1/2003 | Sloot | |
| 2002/0191292 A1 | 12/2002 | Mimura | |

OTHER PUBLICATIONS

Patrick B. Chu et al., Optical Communication Using Micro Corner Cube Reflectors, IEEE, 1997.
V.S. Hsu et al., MEMS Corner Cube Retroreflectors for Free-Space Optical Communications, University of California Publication, Nov. 1999, pp. 1-53.
Lixia Zhou et al., Assembled Corner-Cube Retroreflector Quadruplet, IEEE, 2002, pp. 556-559.
Lixia Zhou et al., Corner-Cube Retroreflectors Based on Structure-Assisted Assembly for . . . , Journal of Microelectromechanical Systems, 2003, 12(3), pp. 233-242.
Xiaoming Zhu et al., Optical Modeling of MEMS Corner Cube Retroreflectors with Misalignment and Nonflatness, IEEE Journal on Quantum Electronics, 2002, 8(1), pp. 26-32.
Corner Cube Retro-Reflectors, Corner Cube Prisms, www.optical-components.com/corner-cube-retroreflector.html, Red Optronics, 2003.

* cited by examiner

*Primary Examiner*—Euncha P. Cherry
(74) *Attorney, Agent, or Firm*—Smith & Hopen, P.A.; Molly L. Sauter

(57) ABSTRACT

The present invention includes a novel method to fabricate corner cube retroreflectors, CCRs, where a majority of the wafer area acts as CCRs as compared to a maximum of 33% in previous MEMS CCRs. The present invention also allows for the fabrication of moveable cantilevers which operate at one-third the voltage as compared to a conventional planar cantilever.

28 Claims, 16 Drawing Sheets

Prior Art

CORNER CUBE RETROREFLECTOR

CROSS REFERENCE TO RELATED APPLICATIONS

This application claims priority to U.S. Provisional Patent Application No. 60/481,234, "Corner Cube Retroreflector", filed Aug. 15, 2003. This application also claims priority to U.S. Provisional Patent Application No. 60/495,377, "Novel Corner Cube Retroreflector and Method of Making", also filed Aug. 15, 2003.

STATEMENT OF GOVERNMENT INTEREST

The work that led to this invention has been supported in part by a grant from the U.S. Army Space and Missile Defense Command, Grant Number DASG 60-00-C-0089. Thus, the United States Government may have certain rights to this invention.

BACKGROUND OF INVENTION

The present invention relates to retroreflective articles having prismatic retroreflective elements.

Micro Electro Mechanical Systems (MEMS) comprises of a range of technologies that enables the fabrication of miniature devices such as sensors and actuators. "Optical MEMS", or "Opto-MEMS", has recently been replaced with the term "MOEMS", for Micro Opto Electro Mechanical Systems. MOEMS derive their functionality from the miniaturization of Optics, Electronics and Mechanics. They employ MEMS to sense, detect or manipulate data, to change light intensity or phase modulation by using refraction, reflection or diffraction principles.

Corner Cube Retro-reflector (CCR) devices are known in the art to provide a variety of applications ranging from reflecting beams coming from the head lights in road signs to miniature and efficient transmitters in a free-space optical communication systems, or remote sensing instruments.

As is known in the prior art, a CCR consists of three mutually orthogonal flat mirror surfaces, forming a concave corner as shown with reference to FIG. 1. A ray of light entering the CCR is reflected back parallel to the incident light, if the light comes from a quadrant of a hemisphere defined by the concave side of the CCR and hits the CCR within a particular area defined by the incident direction. It acts similar to a flat mirror reflecting a normal light ray to its source. While a flat mirror may reflect light from a hemisphere of directions, a CCR is only responsive to light coming from a quadrant of a hemisphere defined by the concave side of the CCR. The advantage of using a CCR over flat mirrors is that the light ray does not need to hit normal to the plane of the mirror to retroreflect.

As illustrated with reference to FIG. 2, by tilting and realigning a mirror or mirrors of the CCR, light can be intermittently reflected away from the direction of the interrogating light source, thereby transmitting a digital signal.

Passive transmitters are known in the art that utilize a micromachined CCR, which can operate at data rates up to 10 kbps over ranges of over 150 meters while only consuming 1 mW of power. The appealing quality of the CCR is that it is extremely low power because it dose not require a dedicated light source. The cost of transmission is limited to the energy required to deflect one of the mirrors, which in the case of a MEMS CCR is very small. The CCR transmitters are a promising technique for ultra-low power, high endurance applications. Using the CCRs as wireless communication links has several advantages including low power, small size, and low cost. The transmitter with a CCR may consume minimal power since it transmits data by reflecting external power. A corner cube retroreflector removes the need for precise angular alignment between the laser source and the CCR; all that is needed is to ensure that incident light is in the acceptance angle quadrant of the CCR.

Batch fabrication technology for micromachining can also yield low cost systems. As a result, remote stations with micromachined sensors and a CCR transmitter have the potential to be low powered, autonomous, small and inconspicuous, so that a large distribution of remote stations may be possible.

Over the years the CCRs have gained importance in many fields. The main advantages in the micromachined CCRs lies in the ability to batch fabricate them. For instance, sensors as employed in combat applications may use the CCRs to transmit information regarding the environmental conditions to an interrogating aircraft with a laser. Additionally, development work has been done using the CCR for wireless digital communications. The CCRs can be used in vehicle-to-vehicle optical two way communication. They are also used in making X-ray image intensifier screens, reflective liquid crystal displays, etc.

The literature contains several techniques to fabricate a CCR using micromachining and other tools. These techniques include "popping-up" of mirrors to make 3-D structures, bonding of mirrors, epitaxial growth of silicon crystal and direct formation of a CCR using cutting tools. The major drawbacks in these methods were the size of the CCR, acceptance angle of the packaged CCR, the abundance of unused chip area and tedious assembly due to the mechanics of the fabrication process.

MEMS technology has been used to fabricate the electrostatically modulating CCRs. A MEMS modulating CCR consists of two fixed mirrors, and one movable mirror. This modulation of one mirror helps in wireless digital communication. Surface micromachining technology allows fabrication of mirrors parallel to the plane of the wafer. The 3-D structures are then achieved by popping one mirror surface out of the plane of the wafer. Different kinds of popping mechanisms have been tried by researchers. Micro manipulators, ultrasonic vibrations, solder surface tension assembly, etc. have been used to get the mirror out of the plane of the wafer. Multi User MEMS Processes (MUMPs) process actuators were used to assemble the mirrors in these kinds of CCRs. MUMPs process is a three layer polysilicon micromachining process. It is a commercial program which provides the user micromachined fabricated devices using polysilicon as the structural material. The mirrors fabricated using MUMPs process suffer from misalignments of the mirror surfaces and also the mirror faces were not flat.

Accordingly, there remains a need in the art for an improved MEMS corner cube retroreflector and method of fabricating corner cube retroreflectors. The improved method should provide CCRs having high packing densities and optimal acceptance angles, while also maximizing the use of the chip area and reducing the operational power requirements of a cantilever.

However, in view of the prior art considered as a whole at the time the present invention was made, it was not obvious to those of ordinary skill in the pertinent art how the identified need could be fulfilled.

SUMMARY OF INVENTION

The present invention provides a method of fabricating corner cube retroreflectors by etching of silicon using different techniques consisting of wet anisotropic along with dry etching, micro machining and various bonding techniques. This fabrication process allows the apex of the CCR to be parallel to the surface, enabling a high acceptance angle when packaged. This novel approach to fabricate the CCRs allows almost 100% of the chip area to act as a CCR compared to the maximum of 33% in the conventional MEMS fabricated CCRs.

In accordance with the present invention, a method of making a corner cube retroreflective assembly is provided. The method includes, selecting a wafer of a single crystal material, the single crystal material would commonly be silicon, having a cubic crystal lattice structure with the facial surface of the wafer oriented in a {100} plane of the cubic structure, forming on the facial surface of the wafer a mask pattern of an ordered array of closely spaced substantially parallel rectangles aligned with the <110> direction of the crystal structure, etching the crystal material with an anisotropic etchant to form an array of V-grooves in the {111} plane of the cubic lattice structure, dicing the wafer to establish a plurality of individual corner cube elements, and placing three individual corner cube elements in relative position with one another to form a corner cube retroreflective assembly.

The present invention also provides a method for determining the crystal flat of the wafer, if necessary. Several methods are within the scope of the present invention, including the use of a fan shaped mask to accurately locate the wafer flat with which to align the v-groove mask.

In a particular embodiment, silicon nitride is utilized to form the mask on the substrate and potassium hydroxide solution is used to etch the crystal material.

In another embodiment, silicon dioxide is utilized to form the mask on the substrate and tetra methyl ammonium hydroxide is used to etch the crystal material.

To provide support for the CCR elements prior to dicing, the array of V-grooves are bonded to a supporting wafer handle. Dicing of the wafer to establish a plurality of individual corner cube elements may be accomplished through wafer dicing utilizing deep reactive ion etching, by single cut dicing utilizing a dicing saw, or laser ablation.

The positioning of the corner cube elements results in the intersection of three planes, each plane having an angle of about 54.74 degrees to the surface of the wafer.

The surface resulting from the V-groove process may not result in a highly reflective mirror material. Accordingly, a thin layer of metal can later be deposited, by sputtering or evaporation techniques, to make the mirror surfaces more reflective. The type of metal should be determined by the wavelength at which the system will operate.

In an additional embodiment, an electrostatically actuated cantilever is formed on at least one of the three individual corner cube elements of the assembly. The cantilever being substantially shaped as an isosceles triangle.

In an additional embodiment, a method of making a corner cube reflective array is provided, including the steps of selecting three wafers of a single crystal material having a cubic crystal lattice structure with the facial surface of each of the three wafers oriented in a {100} plane of the cubic structure, forming on the facial surface of each of the three wafers a mask pattern of an ordered array of closely spaced substantially parallel rectangles aligned with the <110> direction of the crystal structure, etching the crystal material with an anisotropic etchant to form an array of V-grooves in the {111} plane of the cubic lattice structure of each wafer, bonding a stabilization layer to the top side of each of the three wafers, etching the crystal material to remove the residual portions of the three wafers between the V-grooves, wherein etching is performed from the bottom side of the wafer, resulting in a plurality of individual corner cube elements bonded to the stabilization layer, bonding the bottom side of one of the three wafers to a final handle wafer, releasing the stabilization layer from the top side of one of the three wafers, positioning each of the three wafers to be at an angle of 120 degrees relative to each other, and bonding the three wafers to provide an array of corner cube retroreflectors.

In accordance with this embodiment, each of the three wafers vary slightly in thickness to insure that physical contact of the wafers takes place while bonding, without disturbing the prior bonded structures. The result of bonding the three wafers in accordance with this method results in the intersection of three planes, each plane having an angle of about 54.74 degrees to the surface of the array.

The embodiment utilizing three wafers may additionally include an electrostatically actuated cantilever on at least one of the three wafers. The method used to fabricate the cantilever includes laminating a dry film resist on top of the V-grooved wafer, patterning the resist and etching off an underlying and previously deposited phosphosilicate glass (PSG) sacrificial layer to form an anchor to the prior silicon nitride layer, depositing doped poly silicon or suitable structural material on top of the patterned PSG to form the anchored cantilever, and releasing the cantilever by removing the PSG layer to provide a free-moving cantilever.

As such, the present invention provides a novel method to fabricate corner cube retroreflectors (CCRs), wherein a majority of the chip area acts as CCR compared to a maximum of 33% in previous MEMS CCRs. Unlike previous surface micromachined CCRss, where three-dimensional mirrors are formed by rotating plates out of the plane of the wafer, the present method yields all the mirrors within the bulk of the wafer, ensuring very high packing densities and the best possible acceptance angles. The assembled CCR in accordance with the present invention is inherently at the most efficient angle to a window. The novel structure also allows for the fabrication of cantilevers which operate at one-third the actuation voltage as compared to the conventional cantilever of a similar surface dimension.

For a fuller understanding of the nature and objects of the invention, reference should be made to the following detailed description, taken in connection with the accompanying drawings, in which:

DETAILED DESCRIPTION OF THE INVENTION

In an exemplary embodiment of the method of the present invention, anisotropic etching of silicon is used to achieve the flat mirror surfaces. The anisotropic etched V-grooves are then diced, which is then followed by bonding to form the three orthogonal mirror surfaces of the CCR. The advantage of such as approach is that is does not use costly MUMPS processing as is known in the prior art. A CCR fabricated in accordance with the method of the present invention has a wide angle of acceptance and the CCR is inherently at the most efficient angle to the package window. Using the present method, approximately 100% of the chip area can be used to fabricate the CCRs, in contrast to methods known in the art achieving a maximum of 33% useful chip area. Also, as bulk micromachining of single crystal material is used, the mirrors are substantially flat.

It can be calculated that if three planes meet each other orthogonally to form concave corners, they form an angle of 54.74 degrees with the top surface. As demonstrated by the present invention, three mutually orthogonal mirrors at an angle of 54.74 degrees to the surface, and forming a concave corner, can be fabricated using wet etching of silicon.

It is known in the art that KOH (potassium hydroxide) etches {100} planes at a rate of 100 times faster than it etches {111} planes. This method is commonly used to make precise V-shaped grooves and trenches delineated by {111} planes.

In single crystalline silicon wafers, the surface packing densities in the {111} planes are highest. This has been proposed as an explanation for the etch rate of silicon {111} planes being the least in all the silicon etchants. The etch-stop effect of Si {111} planes over other crystal planes leads to specific profiles on different types of silicon substrates.

The etched Si {111} planes are 54.7 degrees slanted with respect to the surfaces of a (100)-wafer, which can create a V-shape profile when masked prior to etching. The crystal plane bounding the etch front and their etch rates are a function of temperature, crystal orientation, and etchant composition. The etch ratio of <110>:<100>:<111> was found to vary from 50:30:1 at 100 degrees C. to about 160:100:1 at room temperature.

Figure 1:
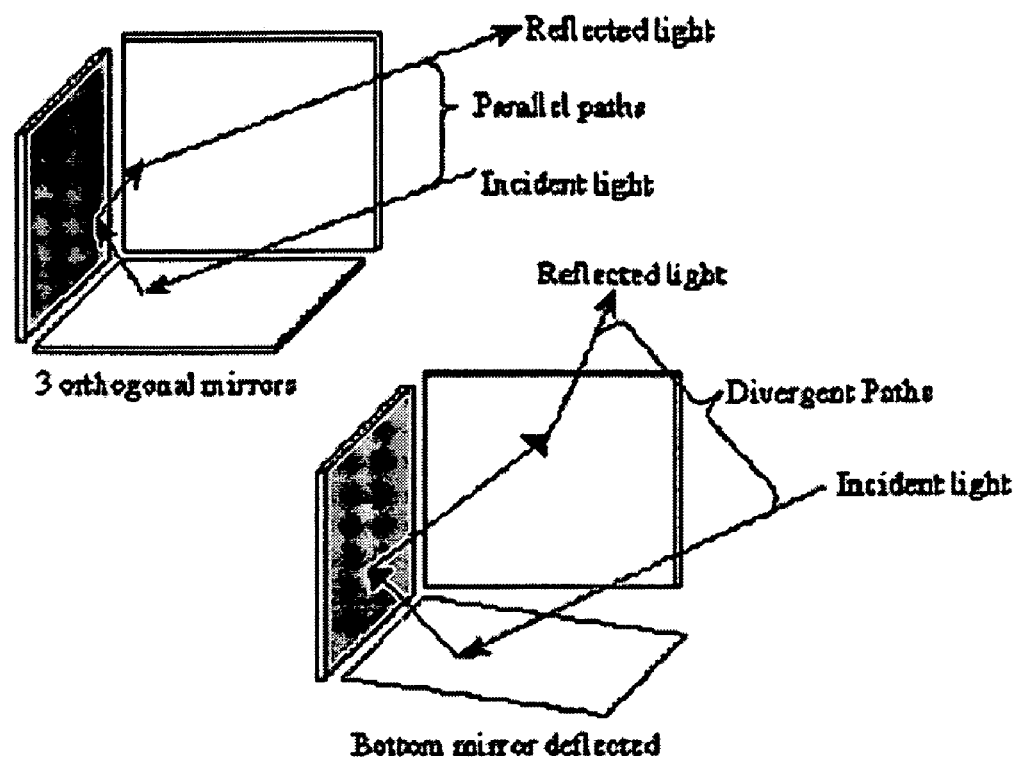
FIG. 1 is a prior art illustration of the basic operation of a modulating corner cube retroflector.
Figure 2:
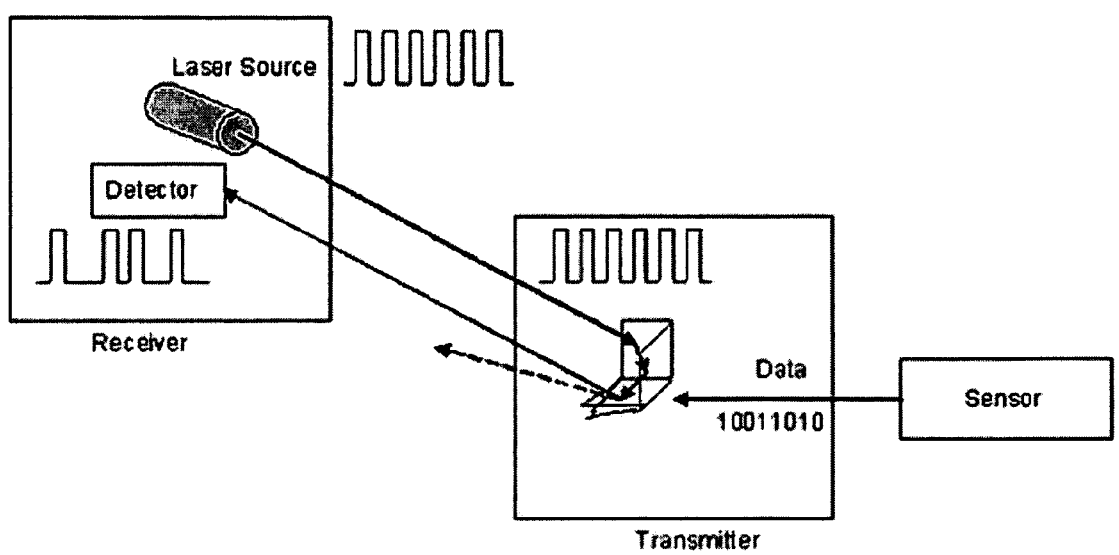
FIG. 2 is a prior art illustration of a schematic of a CCR used in a communication link.
Figure 3:
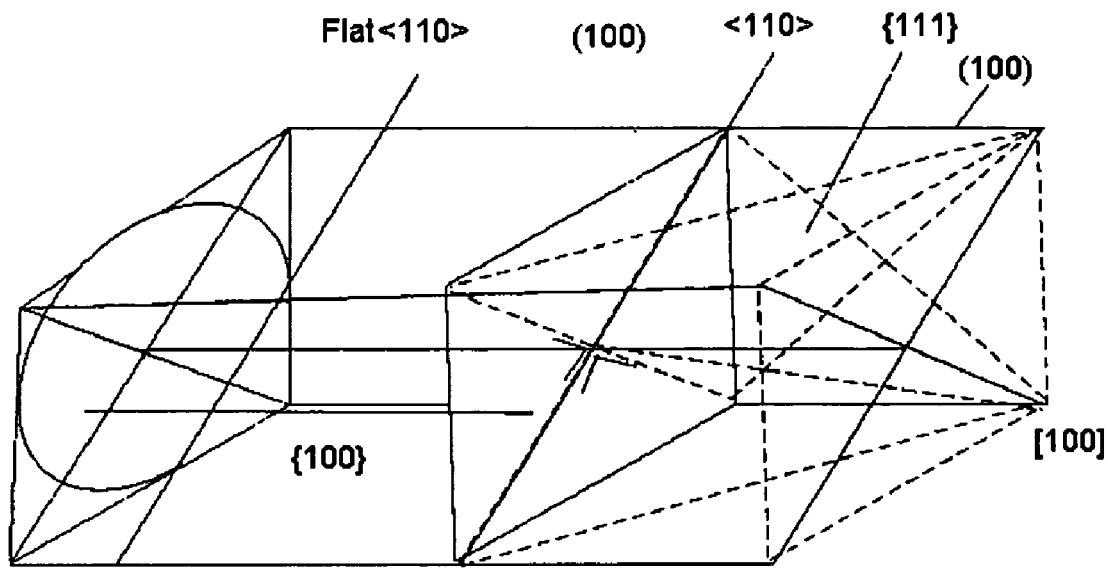
FIG. 3 is a prior art illustration of the crystal planes of a single cubic crystal (100).

As such, the silicon (100) wafer can be processed by anisotropic etching to utilize the etched Si {111} planes to define the mirror surfaces of the corner cube retroreflector. FIG. 3 shows a (100) silicon wafer with reference to its crystal cubic structure. The FIG. 3 shows the (100) silicon wafer with a flat in <110> direction. This {100} plane is also the plane of the wafer. The intersection of {111} and {100} planes lines in the <110> direction. Thus, when a mask containing straight rectangles is precisely aligned to the primary wafer flat, which is <110> direction, the {111} plane is introduced as the exposed sidewall from the very beginning. The wafer can be etched anisotropically in this manner using KOH solution for form V-grooves in the wafer.

If there is misalignment in mask-to-crystal orientation, it has been shown that the lateral etch enlarges the initial pattern because of the misalignment to the silicon crystal direction.

Wafer flats are formed by the manufacturer on the perimeter of silicon wafers and used to identify the approximate crystal orientation relative to the surface of the wafer, and the doping type.

Figure 4:
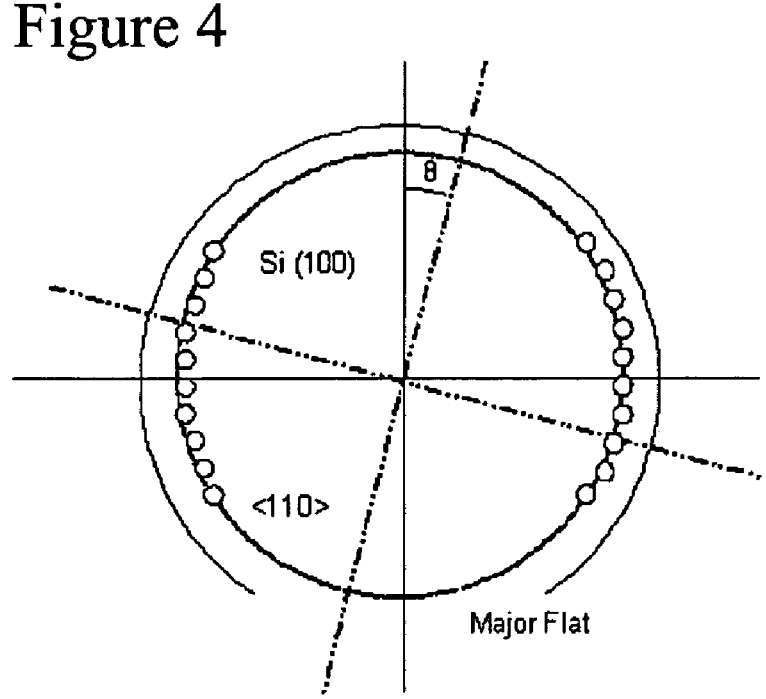
FIG. 4 is an illustration of the circular patterns distributed equally at the East and West sides of the Si wafer used to identify the wafer flat.

In commercial wafers, the wafer flat may be generally offset to the crystal flat by 1–2 degrees. To achieve mirror finish while etching, the mask should be precisely aligned to the crystal flat. Techniques known in the art can be employed to determine the crystal flat. One such technique is known in the art as Ensell's etch mask design [reference-see Rahul]. In accordance with this method, the misorientation of the coarsely ground wafer major flat to <110> direction is improved to an accuracy of 0.1 degrees. FIG. 4 illustrates Ensell's design. As seen in FIG. 4, several circular pattern opening are arranged along an imaginary dotted circle placed about 5 mm inside from the wafer edge of a masking material, such as silicon nitride. The circular patterns are plated within a span of plus-or-minus 2 degrees and are separated from each other by an angular pitch of 0.1 degrees. The etch mask circular patterns initially do not display the crystal direction. Crystalline direction will be displayed when the wafer is immersed in an anistropic wet solution and forms pyramidal pits. The pyramidal pits are comprised of four {111} planes, and the planes intersect the {100} surface to reveal the <110> crystal lines. The square frames of the pyramidal pits can be clearly observed under an optical microscope. The square frames are arranged in such a way that the more deviant the frames are from the crystal direction, the less aligned the frames are with their adjacent frames. After finding the three most closely aligned frames, the central one is determined to be the mask for the <110> orientation. As such, wafer flat with a precision of 0.1 degrees can be located using this method.

Figure 5:
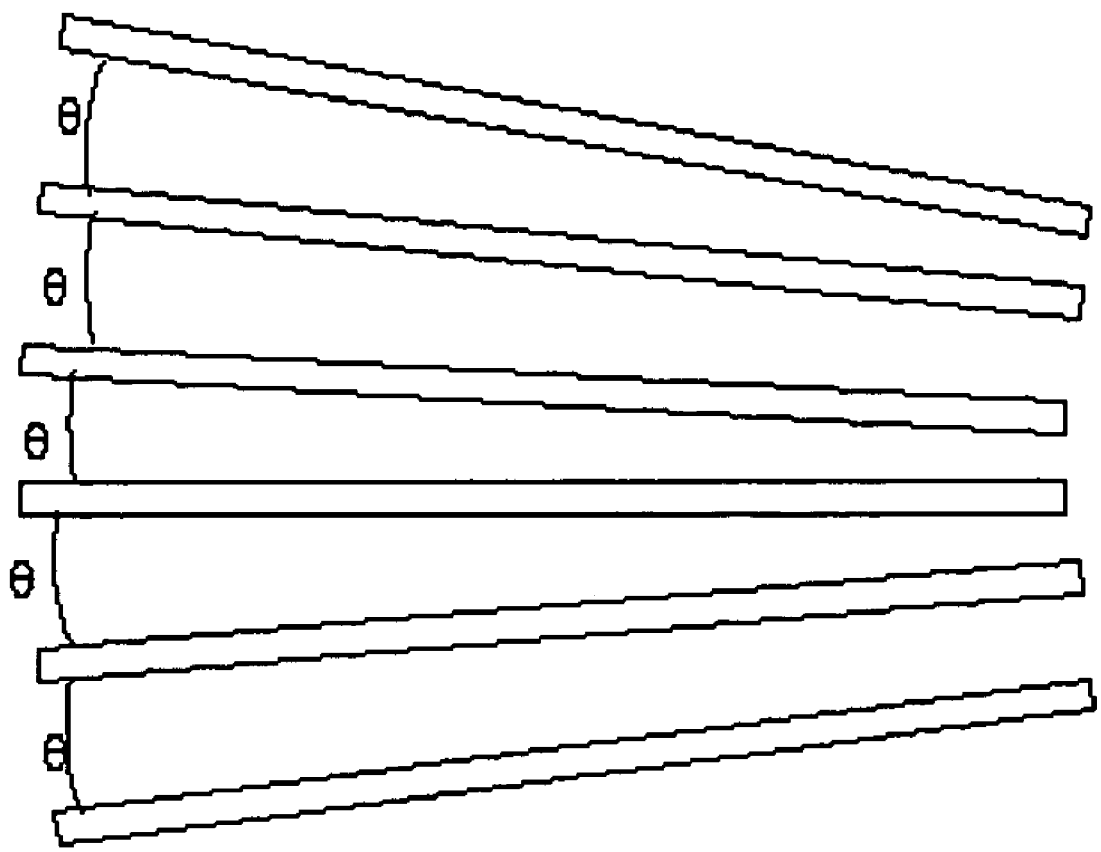
FIG. 5 is an illustration of the wagon wheel, or fan shaped design of the mask used to identify the wafer flat.

In an additional method known in the art to determine the true crystal direction of the silicon, a wagon wheel or fan shape mask design is used. The fan shape design is comprised of a number of identical, long rectangular openings with an angular distance of 0.1 degrees between adjacent patterns. This is shown with reference to FIG. 5. As illustrated, the rectangular openings are positioned in a fan-like pattern distributed on the top and bottom sides of the wafer periphery. As the anisotropic wet etching starts, the opening patterns are etched down. Any misorientation of the pattern to the crystal direction, causes the etch to laterally enlarge the opening under the mask layer but virtually stops at the {111} planes. The enlargement of patterned opening in width indicates the degree of misoriented angles. By observing a trend of gradual increase of opening of the etched slots under an optical microscope, one can trace down the spot with the smallest width. In the same manner, the counterpart can be chosen on the other side of the wafer. These two narrowest slots, selected on the two sides of the silicon wafer are considered as the marks for alignment instead of the wafer flat. This method also claims an accuracy of alignment up to 0.1 degrees.

In a particular embodiment of the present invention, a process flow was developed which can be used to fabricate and assemble different elements of the CCR from different silicon wafers onto a common handle to form a CCR. The process flow for the fabrication of an active CCR is illustrated with reference to FIG. 6 through FIG. 16.

Figure 6:
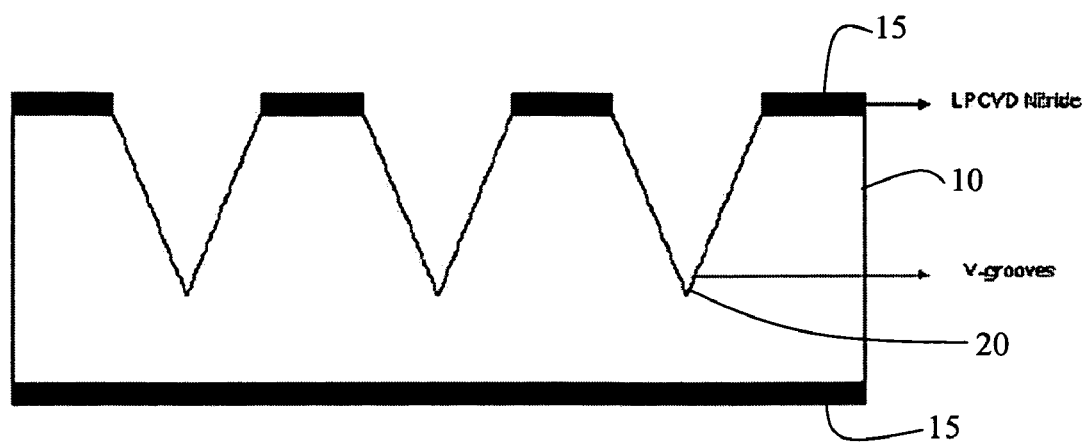
FIG. 6 is an illustration of the cross-sectional view of the wafer after KOH etching when the mask is correctly oriented to the wafer flat.

In an exemplary embodiment, beginning with reference to FIG. 6, on a bare 250 microns double side polished n-type silicon wafer 10, with a masking layer of low stress, low pressure chemical vapor deposition (LPCVD) silicon nitride 15 was deposited. Then V-grooves 20 were formed on the wafer using potassium hydroxide (KOH) as the anisotropic etchant. As previously described, the KOH etching will yield V-groove shapes when the mask is correctly oriented to the wafer flat.

Figure 7:
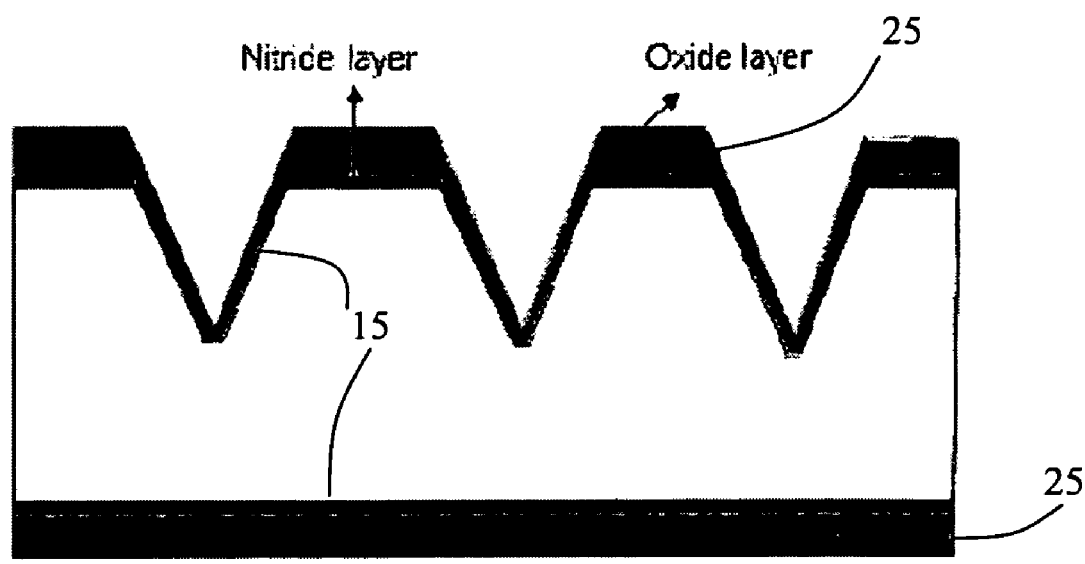
FIG. 7 is an illustration of the cross-sectional view of the wafer after oxide deposition on the V-grooves.

With reference to FIG. 7, a thin layer of phosphor silicate glass 25 (PSG), a doped silicon oxide, is deposited on both sides of the wafer using plasma enhanced chemical vapor deposition (PECVD) or low pressure chemical vapor deposition (LPCVD) as shown. The front side oxide acts as the sacrificial layer when releasing the active structures. It will also prevent a helium leak when through-wafer DRIE is subsequently performed. The backside oxide will act as the masking layer during backside DRIE. In a particular embodiment, two micron thick oxide is used on the front side and an additional micron added on the backside so that after etching the different layers in the follow steps, there is enough remaining oxide on the back so that the silicon surface remains smooth on the back side.

Figure 8:
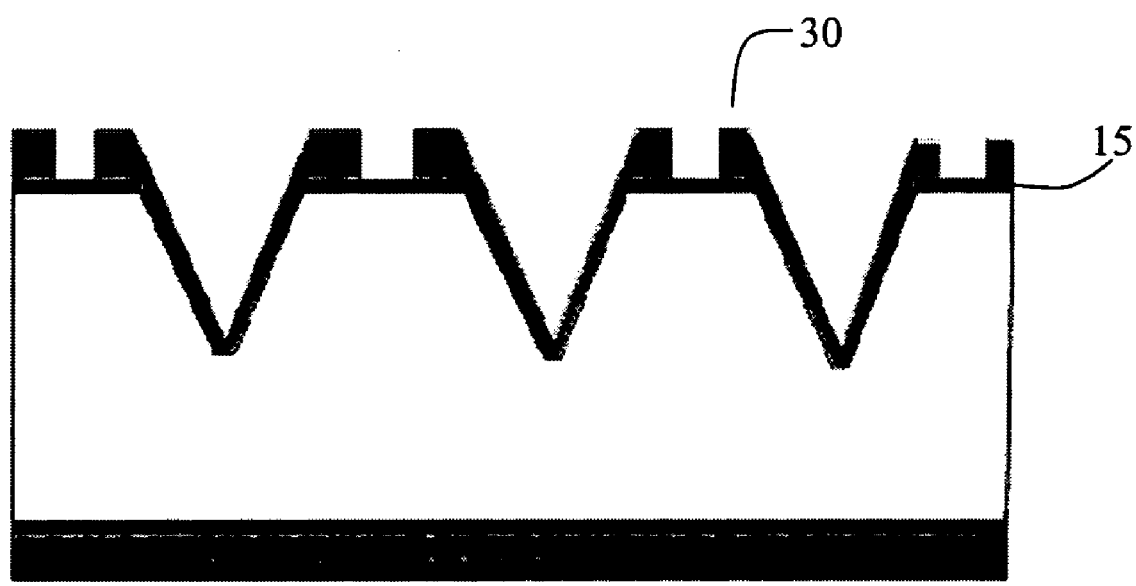
FIG. 8 is an illustration of the cross-sectional view of the wafer after etching the oxide layer to form anchors.

With reference to FIG. 8, a dry film resist is laminated on the top of the V-grooved wafer and the resist is patterned and etched off to expose the PSG using reactive ion etching (RIE), to form an anchor through the oxide 30 to the nitride.

Figure 9:
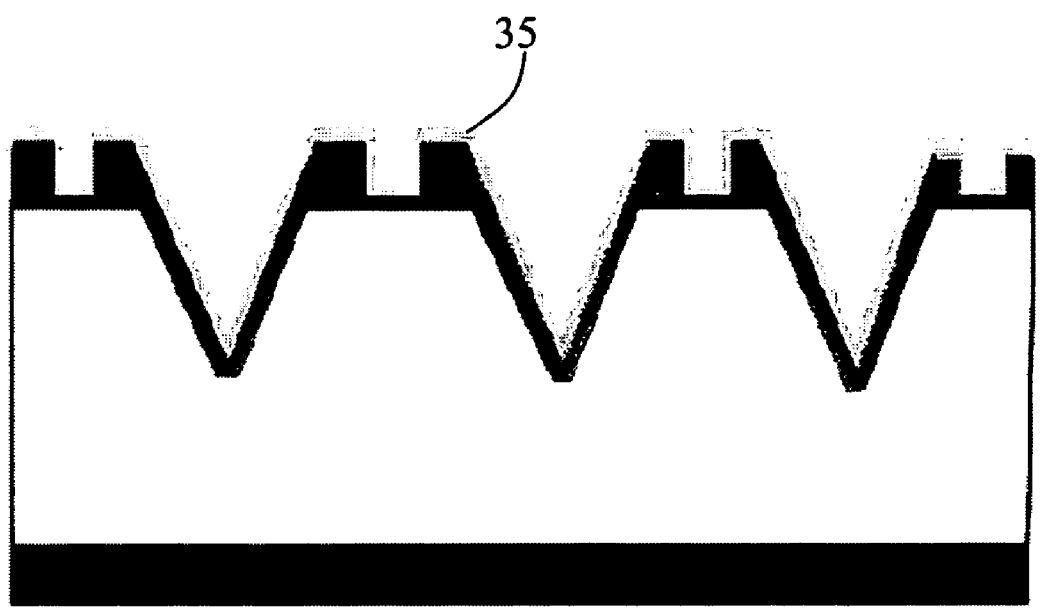
FIG. 9 is an illustration of the cross-sectional view of the wafer after KOH etching and deposition of sacrificial and structural layers.

As shown in FIG. 9, doped poly silicon 35 is deposited on top of the patterned PSG.

Figure 10:
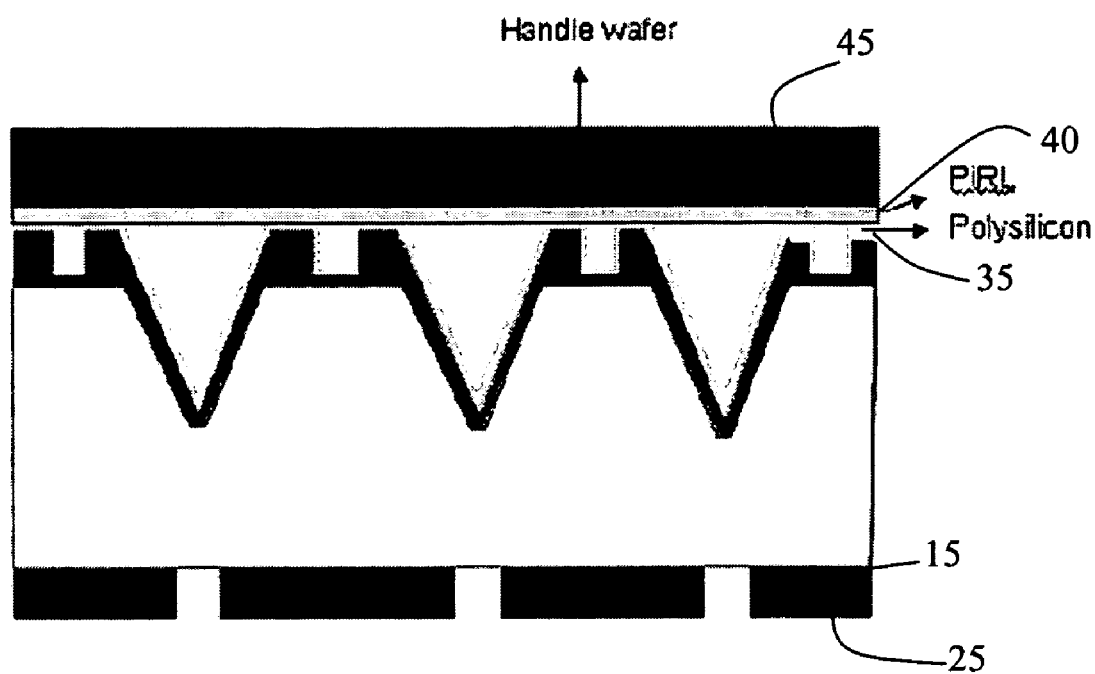
FIG. 10 is an illustration of the cross-sectional view of the bonded wafer.

Referring now to FIG. 10, the back side of the wafer is patterned using spin on photoresist and the exposed oxide 25 and nitride 15 on the back side are etched off using the photoresist as the masking layer. The wafer is then bonded from the top using PiRL III (Brewer Scientific) and a 4 inch glass wafer 45 as the stabilizing handle wafer. PiRL III is a high temperature polyimide which is used here as a bonding layer.

Figure 11:
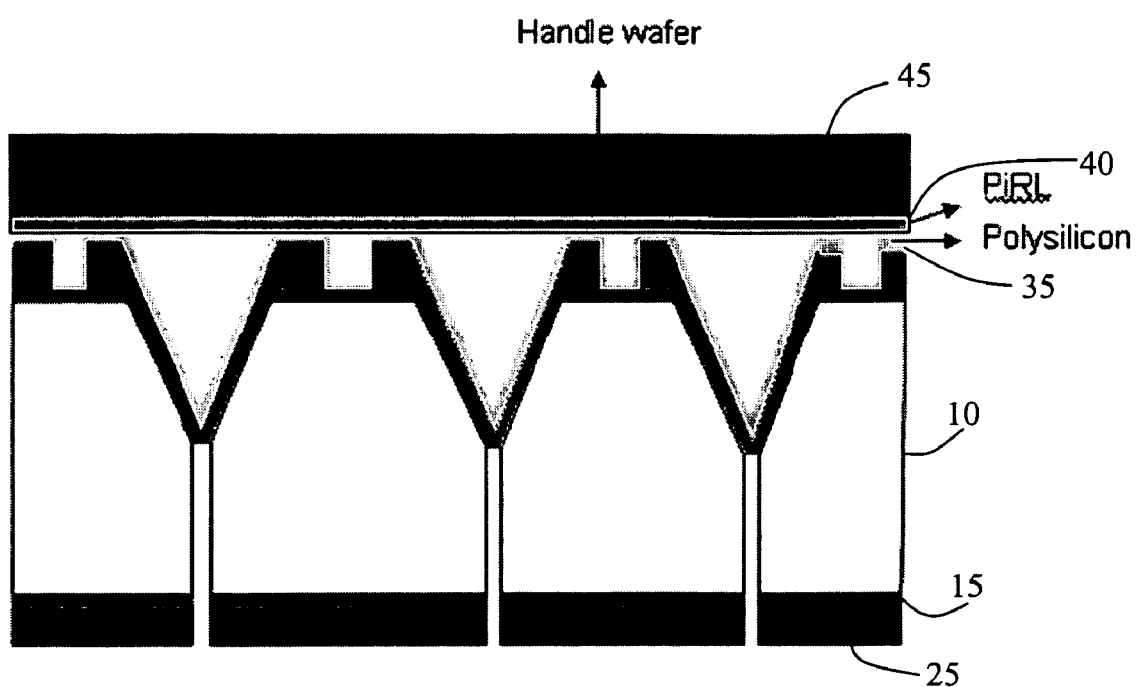
FIG. 11 is an illustration of the cross-sectional view of the wafer after wet and dry etching, containing unreleased cantilevers.
Figure 12:
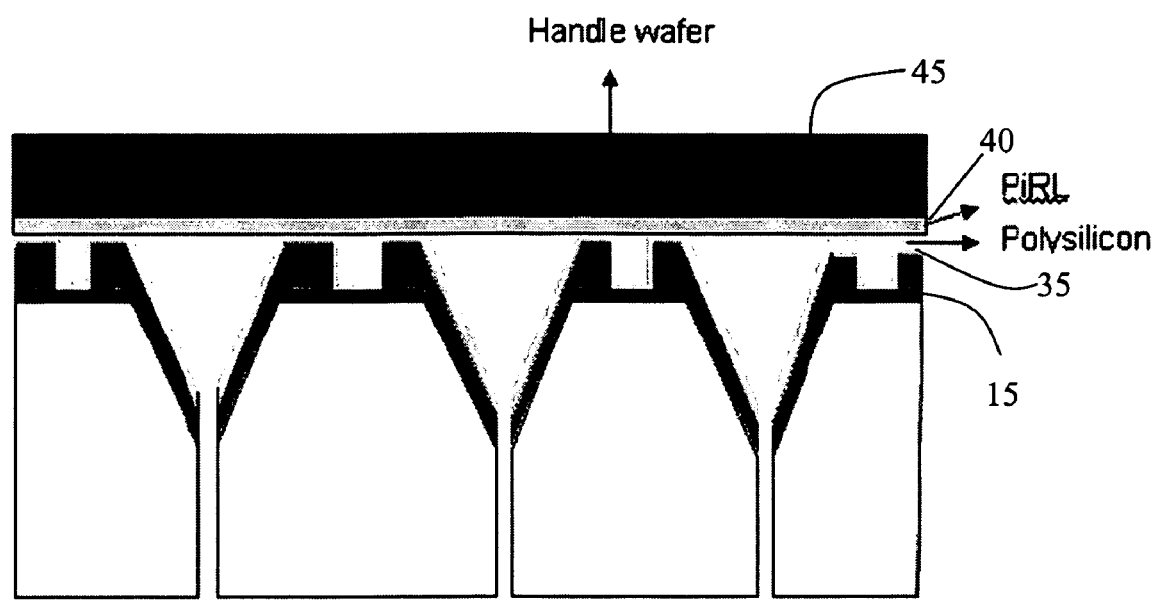
FIG. 12 is an illustration of the cross-sectional view of the wafer after etching off the exposed layers on the back side, containing unreleased cantilevers.

With reference to FIG. 11, DRIE is performed from the back side. Then RIE of PSG and polysilicon layers is then performed sequentially from the back side resulting is the element as shown in FIG. 12. No masking layer is necessary for this step, as only the part to be etched is exposed by the oxide mask 25.

Figure 13:
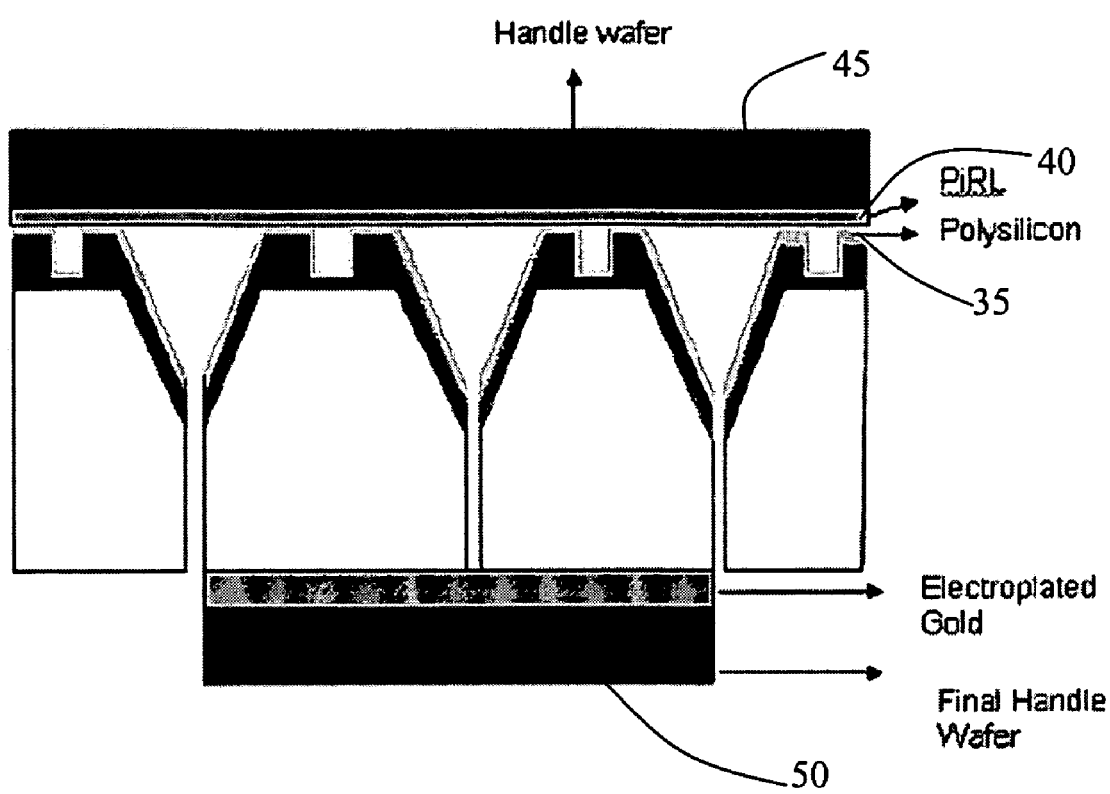
FIG. 13 is an illustration of the cross-sectional view of the wafer after eutectic bonding, containing unreleased cantilevers.

As shown in FIG. 13, the assembly is permanently bonded to the final handle wafer using Au—Si eutectic bonding or thermocompression bonding. The Si which was outside the three inch masking area on the dryetch mask will also be etched during DRIE, hence that area will be held only by a thin oxide layer. Thus, when the assembly is bonded to a three-inch wafer, the area outside the three-inch will be held just by the oxide layer, which can be easily chemically removed. Thus, there will be no unwanted area on the wafer which has the original thickness of the wafer.

Figure 14:
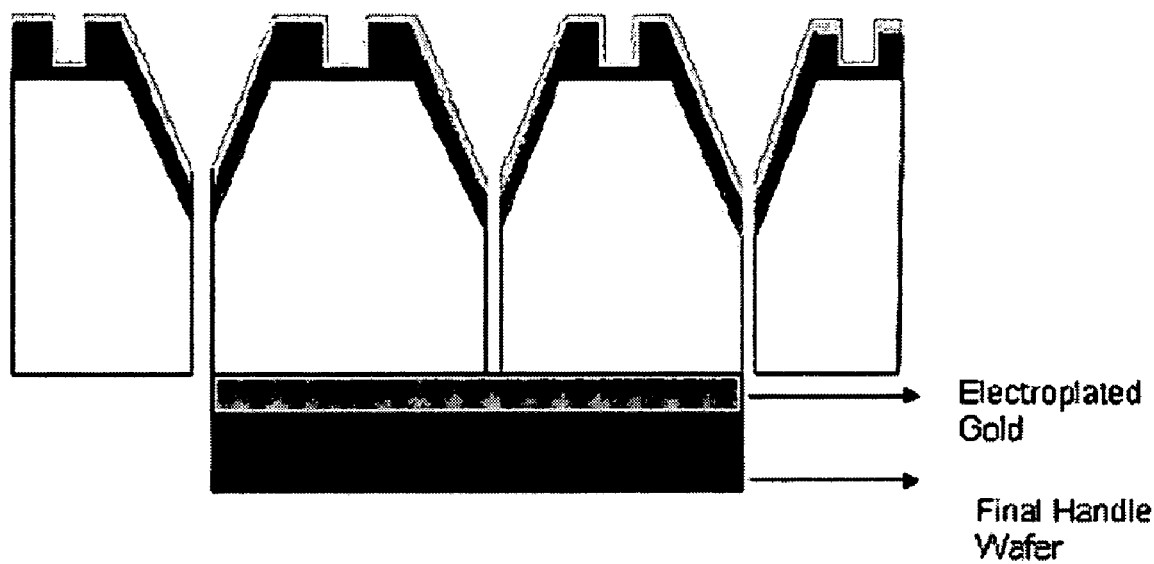
FIG. 14 is an illustration of the cross-sectional view of the wafer after eutectic bonding, with the top wafer released in developer.
Figure 15:
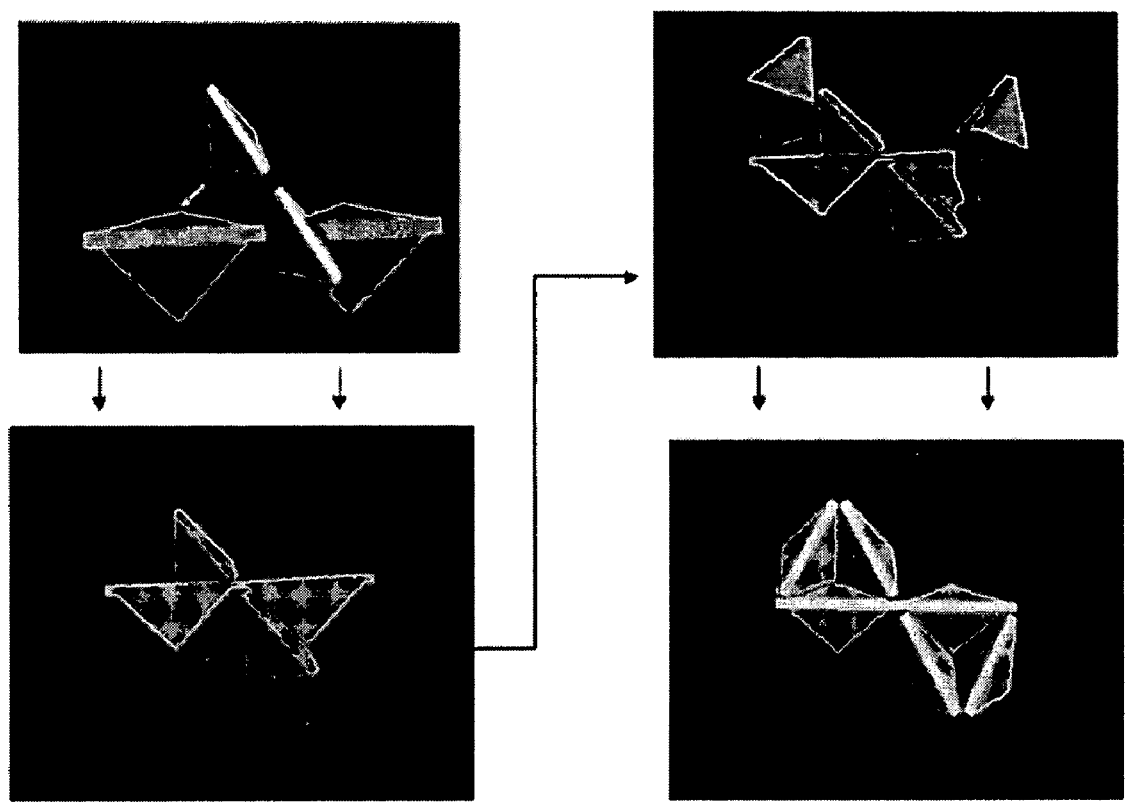
FIG. 15 is an illustration of the assembly process of the CCR structure. Different structures of the CCR from three wafer of different thickness are brought together and bonded to the final handle wafer using eutectic bonding.

Next, the top stabilizing wafer is released by dissolving the bonding layer, resulting in the array of structures as shown in FIG. 14.

The steps outlined above with reference to FIG. 6 through FIG. 14 are then repeated on two other silicon wafers of slightly higher thicknesses, except, the step of forming the final handle wafer is omitted for these two wafers. The changes in the thickness of the wafer is to insure that the physical contact of the wafers takes place while bonding, without disturbing the prior bonded structures. The wafers are then rotated at an angle of 120 degrees to each other and bonded to the final wafer handle as three-dimensionally illustrated with reference to FIG. 15.

Figure 16:
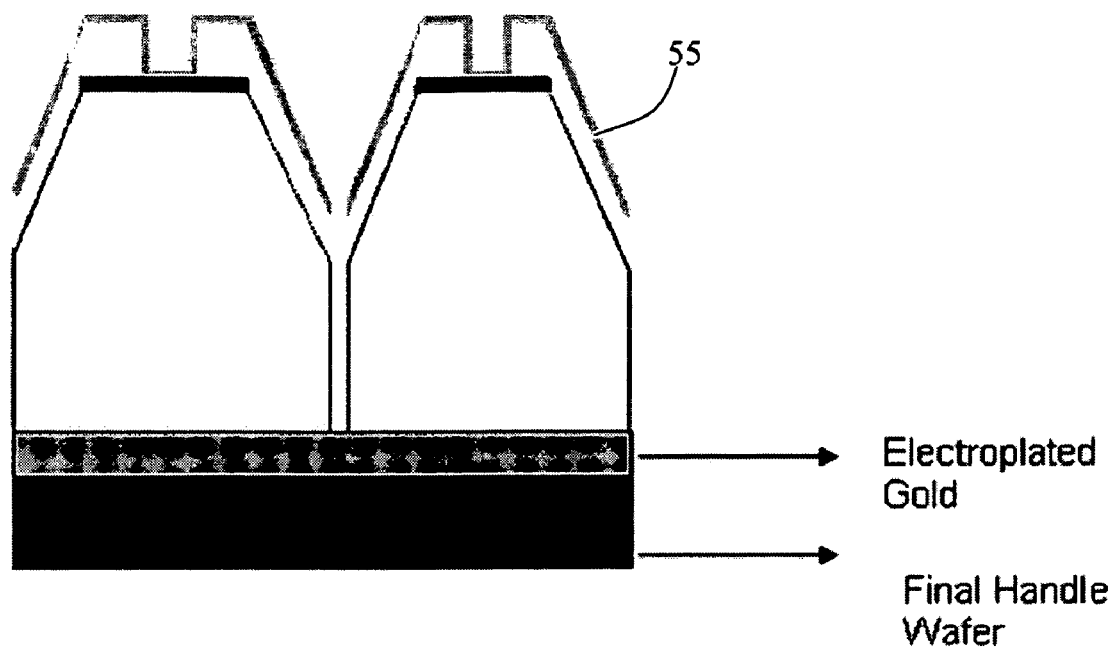
FIG. 16 is an illustration of the cross-sectional view of the wafer after releasing the cantilevers.

Next, the cantilevers are released using an HF release and rinse process through critical point drying (CPD) method, resulting in the free cantilevers 55 illustrated with reference to FIG. 16.

As such, an array of corner cube retroreflectors are fabricated within the bulk of the silicon wafer and utilizing a majority of the wafer surface.

In an alternative embodiment, an array of CCRs are fabricated utilizing dicing in place of back side DRIE to separate the CCR elements.

In an alternative embodiment, an array of CCRs are fabricated utilizing laser machining in place of back side DRIE to separate the CCR elements.

MEMS technology has provided the means to fabricate very small CCRs with moveable mirrors. In the proposed active CCR, one of the mirrors of the CCR is modulated using parallel plate electrostatic actuation mechanisms. Electrostatic actuators are easy to fabricate and can operate at low power and high frequencies, which is important in many MEMS application. Electrostatic actuators can be classified into two categories, non-touching and touching. In the present invention, the moving mirror of the CCR is fabricated on one of the inclined planes of the V-grooved surfaces. The cantilever takes the shape of an isosceles triangle. In accordance with this design, the pull-in voltage of the cantilever is decreased approximately by a factor of 3 when compared to a planar triangular or rectangular cantilever occupying the same surface area on the chip. There are two factors which result in this decreased pull-in voltage. The first is attributed to the area of the moment of inertia of the triangle being less than those of conventional rectangular cantilevers. The second is that the length of the cantilever is increased trigonometrically into the wafer surface, therefore the length of the actual cantilever on the grooves will be more than surface micromachined cantilevers, thus reducing the pull-in voltage.

Various other actuation mechanisms are within the scope of the invention, including electrostatic, thermal, electromagnetic and piezoelectric.

Figure 17:
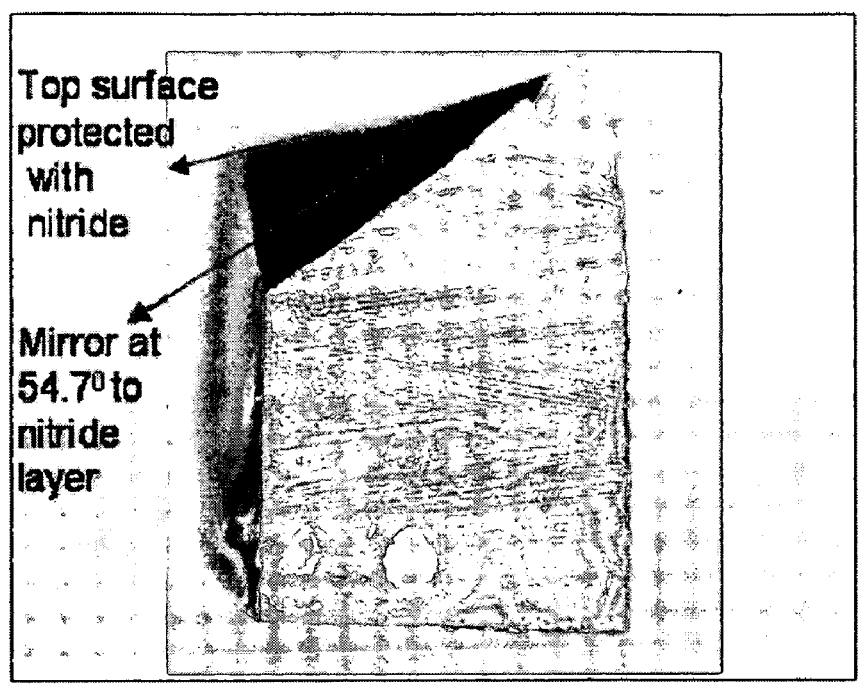
FIG. 17 is an illustration of one of the elements of the CCR. Three of these elements are bonded to form the CCR.
Figure 18:
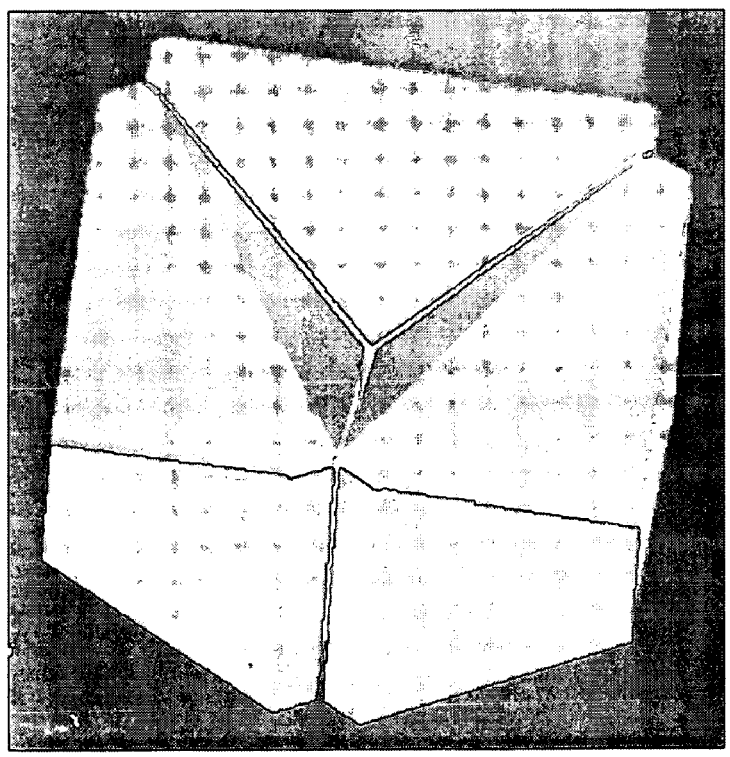
FIG. 18 is an illustration of the assembled elements of the CCR.

In an additional embodiment of the present invention, a process flow was developed which can be used to fabricate and assemble different elements of the CCR from the same silicon wafer and position the elements to for a corner cube retroreflector. The process flow for the fabrication of individual elements from one silicon wafer is similar to the process followed to produce the array of CCRs utilizing three wafers. In accordance with this embodiment, the V-grooved wafer is not bonded to a stabilizing handle. As such, after the V-grooves are diced, they are independent CCR elements or components as shown with reference to FIG. 17. Three components are then picked and placed on a final handling material, such as a glass plate, to form a single corner cube retroreflector and shown with reference to FIG. 18.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

The invention claimed is:

1. A method of making a corner cube retroreflective assembly, comprising the steps of:
    selecting a wafer of a single crystal material having a cubic crystal lattice structure and a facial surface, the facial surface of the wafer oriented in a {100} plane of the cubic structure;
    forming on the facial surface of the wafer a mask pattern of an ordered array of closely spaced substantially parallel rectangles aligned with The <110> direction of the crystal structure;
    etching the crystal material with an anisotropic etchant to form an array of V-grooves in the {111} plane of the cubic lattice structure;
    dicing the wafer to establish a plurality of individual corner cube elements; and
    placing three individual corner cube elements in relative position with one another to form a corner cube retroreflective assembly.

2. The method of claim 1, in which the wafer is single crystal silicon.

3. The method of claim 1, further comprising determining a crystal flat of the wafer.

4. The method of claim 3, further comprising determining a crystal flat of the wafer utilizing a fan shaped mask.

5. The method of claim 1, wherein nitride is utilized to form the mask on the substrate and potassium hydroxide solution is used to etch the crystal material.

6. The method of claim 1, wherein oxide is utilized to form the mask on the substrate and tetra methyl ammonium hydroxide is used to etch the crystal material.

7. The method of claim 1, further comprising prior to the step of dicing the wafer, bonding the array of V-grooves to a supporting wafer handle.

8. The method of claim 1, wherein the step of dicing the wafer to establish a plurality of individual corner cube elements, further comprises through wafer dicing utilizing deep reactive ion etching.

9. The method of claim 1, wherein the step of dicing the wafer to establish a plurality of individual corner cube elements, further comprises single cut dicing utilizing a dicing saw.

10. The method of claim 1, wherein the step of dicing the wafer to establish a plurality of individual corner cube elements, further comprises single cut dicing utilizing laser machining.

11. The method of claim 1, wherein the positioning of the corner cube elements results in the intersection of three planes, each plane having an angle of about 54.74 degrees to the surface of the wafer.

12. The method of claim 1, further comprising forming an electrostatically actuated cantilever on at least one of the three individual corner cube elements of the assembly.

13. The method of claim 1, wherein the cantilever is substantially shaped as an isosceles triangle.

14. The method of claim 1, further comprising the step of depositing a thin layer of metal on the mirror surface of the CCR.

15. A corner cube retroreflector produced according to the process of claim 1.

16. A method of making a corner cube reflective array, comprising the steps of:
    selecting three wafers of a single crystal material having a cubic crystal lattice structure and a facial surface, the facial surface of each of the three wafers oriented in a {100} plane of the cubic structure;
    forming on the facial surface of each of the three wafers a mask pattern of an ordered array of closely spaced substantially parallel rectangles aligned with the <110> direction of the crystal structure;
    etching the crystal material with an anisotropic etchant to form an array of V-grooves in the {111} plane of the cubic lattice structure of each wafer;
    bonding a stabilization layer to the top side of each of the three wafers;
    etching the crystal material to remove the residual portions of the three wafers between the V-grooves, wherein etching is performed from the bottom side of the wafer, resulting in a plurality of individual corner cube elements bonded to the stabilization layer;
    bonding the bottom side of one of the three wafers to a final handle wafer;
    releasing the stabilization layer from the top side of one of the three wafers;
    positioning each of the three wafers to be at an angle of 120 degrees relative to each other;
    bonding the three wafers to provide an array of corner cube retroreflectors.

17. The method of claim 16, wherein each of the three wafers vary slightly in thickness to insure that physical contact of the wafers takes place while bonding, without disturbing the prior bonded structures.

18. The method of claim 16, in which each of the three wafers are single crystal silicon.

19. The method of claim 16, further comprising determining a crystal flat of each of the three wafers.

20. The method of claim 16, further comprising determining a crystal flat of each of the three wafers utilizing a fan shaped mask.

21. The method of claim 16, wherein nitride is utilized to form the mask on the substrate and potassium hydroxide solution is used to etch the crystal material.

22. The method of claim 16, wherein oxide is utilized to form the mask on the substrate and tetra methyl ammonium hydroxide is used to etch the crystal material.

23. The method of claim 16, wherein the positioning of the wafers results in the intersection of three planes, each plane having an angle of about 54.74 degrees to the surface of the array.

24. The method of claim 16, further comprising forming an electrostatically actuated cantilever on at least one of the three wafers.

25. The method of claim 24, wherein the cantilever is substantially shaped as an isosceles triangle.

26. The method of claim 24, further comprising:
laminating a dry film resist on top of the V-grooved wafer;
patterning the resist and etching off the exposed PSG to form an anchor to the nitride layer;
depositing doped poly silicon on top of the patterned PSG to form the cantilever;
releasing the cantilever to provide a free cantilever.

27. The method of claim 16, further comprising the step of depositing a thin layer of metal on the mirror surface of the corner cube retroreflector.

28. A corner cube retroreflector produced according to the process of claim 16.

* * * * *